United States Patent [19]

Tabayashi et al.

[11] Patent Number: 5,091,004
[45] Date of Patent: Feb. 25, 1992

[54] INK COMPOSITION

[75] Inventors: Isao Tabayashi, Saitama; Hiroshi Harada, Osaka; Sadahiro Inoue, Chiba; Hiroshi Fukutomi, Saitama, all of Japan

[73] Assignee: Dainippon Ink and Chemicals, Inc., Tokyo, Japan

[21] Appl. No.: 201,708

[22] Filed: Jun. 3, 1988

[30] Foreign Application Priority Data

Sep. 22, 1987 [JP] Japan .................................. 62-237714

[51] Int. Cl.$^5$ ............................................. C09D 11/02
[52] U.S. Cl. ............................................ 106/22; 106/20
[58] Field of Search .................................. 106/20, 22

[56] References Cited

U.S. PATENT DOCUMENTS

| | | | |
|---|---|---|---|
| 3,994,736 | 11/1976 | Hertz et al. | 106/22 |
| 4,042,545 | 9/1977 | Défago et al. | 106/22 |
| 4,057,388 | 11/1977 | Defago et al. | 106/22 |
| 4,106,027 | 8/1978 | Hoffmann et al. | 106/22 |
| 4,163,675 | 9/1979 | Hirano et al. | 106/22 |
| 4,168,662 | 9/1979 | Fell | 106/22 |
| 4,306,875 | 12/1981 | De Fao et al. | 106/22 |
| 4,386,961 | 6/1983 | Lin | 106/22 |
| 4,396,429 | 8/1983 | Matsumoto et al. | 106/22 |
| 4,695,846 | 9/1987 | Suzuki | 106/22 |
| 4,789,399 | 12/1988 | Williams et al. | 106/22 |

*Primary Examiner*—Mark L. Bell
*Assistant Examiner*—Helene Klemanski
*Attorney, Agent, or Firm*—Armstrong, Nikaido, Marmelstein, Kubovcik & Murray

[57] ABSTRACT

An organic solvent-based ink composition for ink jet printer comprises a dye or dyes dissolved in a mixed solvent of a good solvent and a poor solvent, wherein (1) a solvent having a dye solubility of at least 4% by weight is used as the good solvent,
(2) a solvent having a dye solubility of less than 0.5% by weight is used as the poor solvent, and
(3) when the dye solubility for the aforesaid mixed solvent is a % by weight and the concentration of the dye or dyes in the ink composition to the mixed solvent is b % by weight, the value of a/b is within the range of from 1.0 to 3.0.

6 Claims, No Drawings ized dye or dyes in a mixed solvent of a good solvent and a poor solvent, wherein

INK COMPOSITION

FIELD OF THE INVENTION

This invention relates to an organic solvent-based ink composition for an ink jet printer using electrostatic force, in which ink is ejected from ink nozzles by applying an electric potential different between plural electrodes disposed in an ink chamber and counter electrode.

BACKGROUND OF THE INVENTION

In various ink jet recording systems, a so-called an electrostatic ink-jet by utilizing electrostatic force, with which the present invention is concerned, can form very high precise images by combining with an organic solvent-based ink composition.

On the other hand, the ink jet recording system has such faults as clogging of nozzles, clogging of filters, change of ink compositions with the passage of time, etc., and well as other fault that the system is liable to cause abnormal ejection by various factors, which are the largest causes of obstructing the propagation of the system.

In electrostatic ink-jet system, with which the present invention is concerned, obtaining stable jetting largely influences on the reliability of the system as in other systems, and for the purpose, there are proposed the viscosity and specific resistance of an ink composition as properties in Japanese Patent Application (OPI) No. 50935/74 and the relative dielectric constant and specific resistance of a solvent for an ink composition as the properties in Japanese Patent Application (OPI) No. 29808/78. The term "OPI" as used herein indicates an "unexamined published Japanese patent application".

Also, in regard to ink compositions for general ink jet printer, for stabilizing the dissolution or dispersion of color materials being used, ink compositions using improved solvents are proposed in Japanese Patent Application (OPI) Nos. 3443871/82, 78050/80, 3871/82, 3873/82, and 36381/86. However, according to the inventor's experiments, these ink compositions not always give stably ejecting inks in electrostatic ink-jet system with which the present invention is concerned.

SUMMARY OF THE INVENTION

The object of this invention is, therefore, to solve the aforesaid problems. That is, the object is to provide an organic solvent-based ink composition capable of giving stable ejecting inks in an ink jet printer using electric field control system without reducing the dissolution stability of color materials.

Thus, according to this invention, there is provided an organic solvent-based ink composition for ink jet printer comprising a dye or dyes dissolved in a mixed solvent of a good solvent and a poor solvent, wherein (1) a solvent having a dye solubility of at least 4% by weight is used as the good solvent,
(2) a solvent having a dye solubility of less than 0.5% by weight is used as the poor solvent, and
(3) when the dye solubility for the aforesaid mixed solvent is a % by weight and the concentration of the dye or dyes in the ink composition to the mixed solvent is b % by weight, the value of a/b is within the range of from 1.0 to 3.0.

DETAILED DESCRIPTION OF THE INVENTION

The inventors prepared ink compositions composed of combinations of various kinds of oil-soluble dyes and various kinds of organic solvents as organic solvent-based ink compositions for electrostatic ink jet recording system, said ink compositions capable of giving stable ink jetting, and investigated the ejecting stability for a long period of time by an ink jet printer using an electric field control system.

According to the present invention, the poor solvents each has a solubility for the dye being used of less than 0.5% by weight and the good solvents each has a solubility for the dye being used of at least 4.0% by weight. Also, when the solubility of a dye in a mixed solvent is defined as a % by weight and the concentration of the dye in the ink composition is defined as b % by weight, the ink composition is adjusted so that the value of a/b is in the range of from 1.0 to 3.0.

The solubility used in the present invention means a weight percent of a solute in a mixture comprising the solute and a solvent at a temperature of 20° C.

In the electrostatic ink-jet recording system, when the poor solvent having a solubility of lower than 0.5% with respect to a dye is experimentally used in a mixed solvent, an excellent ink ejecting stability is obtained. Contrarily, when the poor solvent having a solubility of 0.5% or higher is used, the ink ejecting stability becomes unsatisfactory.

The value of a/b is one of the indispensable features of the present invention. The ink ejecting stability is exclusively obtained when the value of a/b is within a range from 1.0 to 3.0.

The inventors do not specifically study the reason why the stable ejection is attained according to the present invention, however, it is considered as follows.

That is, if the good solvent having high polarity is mixed with the poor solvent having low polarity so that a polarity of mixed solvent may be lowered controlling a solubility of dye in the mixed solvent to within three times thereof with respect to an amount of dye used in an ink composition, an electrochemical reaction of components in the ink composition by an electric current which runs therethrough and is generated on ejection due to electrostatic gravitational force, is minimized. As the results, an ejection hindrance due to a foreign matter such as bubbles, precipitates formed by the electrochemical reaction, etc., is remarkably improved. If a solubility of dye in the poor solvent is not less than 0.5, a polarity of the mixed solvent sharply rises thereby deteriorating the ejection stability due to less effect for lowering the polarity of the mixed solvent in which the poor solvent is mixed with the good solvent. Thus, the value of a/b is determined as 1.0 to 3.0 to maintain stability in dissolution of dye in ink.

As the result of the investigation, it was found that an ink composition obtained by dissolving a dye in a good solvent alone showed abnormal ejecting ink in a very short period of time to make recording impossible. Also, in an ink composition obtained by dissolving a dye in a single solvent having a dye solubility of less than 4.0% by weight or a mixture of such solvents, relatively stable ejection can be obtained but since in a practical concentration range of dye, the deposition of dye occurs under a circumstance of lower than room temperature, there is a problem at practical use.

Accordingly, as the result investigation about a mixed solvent composed of a good solvent and a poor solvent, it has been discovered that the organic solvent-based ink composition for ink jet printer of this invention (hereinafter, is referred to as simply an ink composition of this invention) gives very stable ink ejection for a long period of time and shows excellent dissolution stability. In this case, when the content of the poor solvent in the ink composition is at least 50% by weight, more stable ejection is obtained. Furthermore, the concentration of a dye being used is preferably 0.5% by weight or more from the point of recording density and is also preferably 10.0% by weight or less from the points of the viscosity and specific resistance of the ink composition.

In this invention, any dyes which are soluble in a mixed solvent composed of organic solvents in a definite range can be used. Typical examples of the dyes which can be used in this invention are azo dyes, metal complex azo dyes, naphthol dyes, anthraquinone dyes, indigo dyes, carbonium dyes, quinoimine dyes, cyanine dyes, quinoline dyes, nitro dyes, nitroso dyes, benzoquinone dyes, naphthoquinone dyes, naphthalimide dyes, perinone dyes, phthalocyanine dyes, etc. These dyes may be used singly or as a mixture thereof.

The combination of a good solvent and a poor solvent being used in this invention differs to some extent according to the kind of dye but since a dye is, in general tendency, a polar material, a high-polar solvent is used as the good solvent and a low-polar solvent is used as the poor solvent. In this case, however, since these solvents are used as a mixed solvent, the combination thereof and the mixing ratio of them must be selected so that the good solvent and the poor solvent are sufficiently mixed with each other in the mixing ratio.

Also, good solvents and poor solvents, each may be used singly or as a mixture thereof.

The poor solvents are organic solvent having low polarity, such as aliphatic hydrocarbons, naphthenic hydrocarbons, and aromatic hydrocarbons (e.g., mono- or di-alkylnaphthalene, alkyl derivatives of biphenyl, xylylethane, phenethylcumene, etc.). The good solvents are organic solvents having high polarity, such as glycols, mono- or di-alkyl ethers of glycols, fatty acids and fatty acid esters; and nitrogen-containing organic compounds (e.g., amides, pyrrolidone compounds, etc.). However, the solvents for use in this invention are not limited to the aforesaid organic solvents.

In this case, however, since the solubility of a dye being used in these organic solvents differs to a considerable extent according to the structure of the dye, the combination of the good solvent and the poor solvent must be selected according to the nature of each dye.

A good solvent and a poor solvent each having higher boiling point are more advantageous in the drying property by evaporation but since a solvent having higher boiling point has a tendency of increasing higher the viscosity of the ink composition, it is necessary to select solvents having properties for attaining a desired ink composition having desired viscosity and boiling point, in connection with the counterplan for drying prevention of printer.

Then, the invention is explained more practically by the following examples. Unless otherwise indicated, all parts, percents and ratios are by weight.

EXAMPLE 1

| | |
|---|---|
| Black Oil-Soluble Dye (Nigrosine dye: C.I. Solvent Black 7) | 4.0% |
| Poor Solvent (Phenethylcumene) | 81.0% |
| Good Solvent (Oleic acid) | 15.0% |

After sufficiently dissolving the aforesaid dye in the mixture of the solvents at room temperature, the solution was filtrated by a membrane filter having poresize of 0.45 micron to provide an ink composition.

When continuous ejection was performed by an electrostatic ink jet printer using the ink composition thus obtained, stable ejection was obtained even after 500 hours. Also, when the ink composition was stored for 6 months at room temperature, the ink composition kept the dissolution stability and gave stable jetting of ink.

In Example 1, the solubilities (shown in %) of the black oil-soluble dye (Nigrosine dye) in the poor solvent (phenylcumene), the good solvent (oleic acid), and the mixed solvent were 0.04, 15.0, and 10.4, respectively. Thus, the value of a/b of the ink composition in Example 1 was 2.6.

EXAMPLE 2

| | |
|---|---|
| Black Oil-Soluble Dye (Nigrosine dye: C.I. Solvent Black 7) | 4.5% |
| Poor Solvent (Phenethylcumene) | 70.5% |
| Poor Solvent (Naphthene) | 10.0% |
| Good Solvent (Oleic acid) | 15.0% |

After sufficiently dissolving the dye in the mixture of the solvents at room temperature, the solution was filtrated by a membrane filter having pore size of 0.45 micron to provide an ink composition.

When continuous ejection was performed by an electrostatic ink jet printer using the ink composition thus obtained, the ink composition give stable ejection even after 500 hours. Also, when the ink composition was stored for 6 months at room temperature, the ink composition kept the stable dissolution stability and gave stable ejection.

In Example 2, the solubilities (shown in %) of the black oil-soluble dye (nigrosine dye) in the poor solvent (phenethylcumene), the poor solvent (naphthene), the good solvent (oleic acid), and the mixed solvent were 0.04, 0.01, 11.3, and 7.70, respectively. Thus, the value of a/b of the ink composition in Example 2 was 1.7.

EXAMPLE 3

| | |
|---|---|
| Black Oil-Soluble Dye (Chromium-complex azo dye: C.I. Solvent Black 43) | 3.0% |
| Poor Solvent (Di-isopropylnaphthalene) | 82.0% |
| Good Solvent (Oleic acid) | 15.0% |

After sufficiently dissolving the aforesaid dye in the mixture of the solvents, the solution was filtrated by a membrane filter having poresize of 0.45 micron to provide an ink composition.

When continuous ejection was performed by an electrostatic ink jet printer using the ink composition thus obtained, stable ejection was obtained even after 500 hours. Also, when the ink composition was stored for 6 months at room temperature, the ink composition kept the dissolution stability and gave stable ejecting ink.

In Example 3, the solubilities (shown in %) of the black oil-soluble dye (chromium-complex azo dye) in the poor solvent (di-isopropylnaphthalene), the good solvent (oleic acid), and the mixed solvent were 0, 7.0, and 3.6, respectively. Thus, the value of a/b of the ink composition in Example 3 was 1.2.

EXAMPLE 4

| | |
|---|---|
| Cyan Oil-Soluble Dye (Copper phthalocyanine dye: C.I. Solvent Blue 70) | 4.0% |
| Poor Solvent (Dimethylnaphthalene) | 40.0% |
| Good Solvent (Diethylene glycol dimethyl ether) | 56.0% |

After sufficiently dissolving the aforesaid dye in the mixture of the solvents, the solution was filtrated by a membrane filter having poresize of 0.45 micron to provide an ink composition.

When continuous ejection was performed by an electrostatic ink jet printer using the ink composition obtained, stable ejection was obtained even after 300 hours. Also, when the ink composition was stored for 6 months at room temperature, the ink composition kept the dissolution stability and gave stable ejection.

In Example 4, the solubilities (shown in %) of the cyan oil-soluble dye (copper phthalocyanine dye) in the poor solvent (dimethylnaphthalene), the good solvent (diethylene glycol dimethyl ether), and the mixed solvent were 0.06, 20.5, and 10.4, respectively. Thus, the value of a/b of the ink composition in Example 4 was 2.6.

EXAMPLE 5

| | |
|---|---|
| Cyan Oil-Soluble Dye (Copper phthalocyanine dye: C.I. Solvent Blue 25) | 5.0% |
| Poor Solvent (Phenethylcumene) | 85.0% |
| Good Solvent (N-Butyl-p-toluenesulfonamide) | 56.0% |

After sufficiently dissolving the aforesaid dye in the mixture of the solvents at room temperature, the solution was filtered by a membrane filter having poresize of 0.45 micron.

When continuous ejection was performed by an electrostatic ink printer using the ink composition thus obtained, stable ejection was obtained even after 500 hours. Also, when the ink composition was stored for 6 months at room temperature, the ink composition kept the dissolution stability and gave stable ejecting of ink.

In Example 5, the solubilities (shown in %) of the cyan oil-soluble dye (copper phthalocyanine dye) in the poor solvent (phenethylcumene), the good solvent (N-butyl-p-toluenesulfonamide), and the mixed solvent were 0.08, 28.5, and 7.3, respectively. Accordingly, the value of a/b of the ink composition was 1.5.

EXAMPLE 6

| | |
|---|---|
| Magenta Oil-Soluble Dye (Rhodamine dye: C.I. Solvent Red 49) | 7.0% |
| Poor Solvent (Phenethylcumene) | 61.0% |
| Poor Solvent (Phenylxylylethane) | 17.0% |
| Good Solvent (Oleic acid) | 15.0% |

After sufficiently dissolving the aforesaid dye in the mixture of the solvents at room temperature, the solution was filtered by a membrane filter having poresize of 0.45 micron to provide an ion composition.

When continuous ejection was performed by an electrostatic ink jet printer using the ink composition thus obtained, stable jetting was obtained even after 500 hours. Also, when the ink composition was stored for 6 months at room temperature, the ink composition kept the dissolution stability and gave stable ink ejection.

In Example 6, the solubilities (shown in %) of the magenta oil-soluble dye (rhodamine dye) in the poor solvent (phenethylcumene), the poor solvent (phenylxylylethane), the good solvent (oleic acid), and the mixed solvent were 0.01, 0.02, 25.5 and 8.4, respectively. Thus, the value of a/b of the ink composition in Example 6 was 1.2.

EXAMPLE 7

| | |
|---|---|
| Magenta Oil-Soluble Dye (Rhodamine dye: Spilon Red C-BH (Hodogaya Chemical K.K.)) | 3.5% |
| Poor Solvent (Phenethylcumene) | 64.5% |
| Poor Solvent (Di-isopropylnaphthalene) | 7.0% |
| Good Solvent (Oleic acid) | 15.0% |
| Good Solvent (Diglyme) | 10.0% |

After sufficiently dissolving the aforesaid dye in the mixture of the solvents at room temperature, the solution was filtrated by a membrane filter having poresize of 0.45 micron to provide an ink composition.

When continuous ejection was performed by an electrostatic ink jet printer using the ink composition thus obtained, stable ejection was obtained even after 500 hours. Also, when the ink composition was stored for 6 months at room temperature, the ink composition kept the dissolution stability and gave stable ejecting ink.

In Example 7, the solubilities (shown in %) of the magenta oil-soluble dye (rhodamine dye) in the poor solvent (phenethylcumene), the poor solvent (di-isopropylnaphthalene), the good solvent (oleic acid), the good solvent (di-glyme), and the mixed solvent were 0.242, 0.216, 17.5, 11.2 and 9.2, respectively. Accordingly, the value of a/b of the ink composition in Example 7 was 2.6.

EXAMPLE 8

| | |
|---|---|
| Yellow Oil-Soluble Dye (Diphenylmethane dye: AL Yellow 3101 (Chuo Synthetic Chem. Co.)) | 3.0% |
| Poor Solvent (Phenethylcumene) | 87.0% |
| Good Solvent (Diethylene glycol hexyl ether) | 5.0% |
| Good Solvent (N-Butyl-p-toluenesulfonamide) | 5.0% |

After sufficiently dissolving the aforesaid dye in the mixture of the solvents at room temperature, the solution was filtrated by a membrane filter having poresize of 0.45 micron.

When continuous ejection was confirmed by an electrostatic ink jet printer using the ink composition thus obtained, stable ejection was obtained even after 500 hours. Also, when the ink composition was stored for 6 months at room temperature, the ink composition kept the dissolution stability and gave stable jetting ink.

In Example 8, the solubilities (shown in %) of the yellow oil-soluble dye (diphenylmethane dye) in the poor solvent (phenethylcumene), the poor solvent (N-butyl-p-toluenesulfonamide), and the mixed solvent were 0.30, 8.0, 20.0 and 6.0, respectively. Thus, the value of a/b of the ink composition in Example 8 was 2.0.

EXAMPLE 9

| Yellow Oil-Soluble Dye | 4.0% |
|---|---|
| (Azo dye: C.I. Solvent Yellow 162) | |
| Poor Solvent (Phenethylcumene) | 41.0% |
| Good Solvent | 55.0% |
| (Tricresyl phosphate) | |

After sufficiently dissolving the aforesaid dye in the mixture of the solvents at room temperature, the solution was filtrated by a membrane filter having poresize of 0.45 micron to provide an ion composition.

When continuous ejection was performed by an electrostatic ink jet printer using the ink composition thus obtained, stable ejection was obtained even after 300 hours. Also, when the ink composition was stored for 6 months at room temperature, the ink composition kept the dissolution stability and gave stable jetting of ink.

In Example 9, the solubilities (shown in %) of the yellow oil-soluble dye (azo dye) in the poor solvent (phenethylcumene), the good solvent (tricresyl phosphate), and the mixed solvent were 0.034, 9.1, and 7.00, respectively. Accordingly, the value of a/b of the ink composition in Example 6 was 1.75.

Then, comparison examples are shown below, wherein the values of a/b were all over 3.0.

COMPARISON EXAMPLE 1

| Black Oil-Soluble Dye | 4.0% |
|---|---|
| (Same, as the dye in Example 1) | |
| Good Solvent (Carbitol) | 81.0% |
| Good Solvent (Oleic acid) | 15.0% |

After sufficiently dissolving the aforesaid dye in the mixture of the solvents at room temperature, the solution was filtrated by a membrane filter having poresize of 0.45 micron.

When continuous ejection was performed by an electrostatic ink jet printer using the ink composition thus obtained, abnormal ejection of ink occurred after 10 hours.

In Comparison Example 1, the solubilities (shown in %) of the black oil-soluble dye in the good solvent (carbitol), the good solvent (oleic acid), and the mixed solvent were 22.0, 15.0, and 19.0, respectively. Thus, the value of a/b of the ink composition in Comparison Example 1 was 4.8.

COMPARISON EXAMPLE 2

| Black Oil-Soluble Dye | 4.0% |
|---|---|
| (Same as the dye in Example 2) | |
| Poor Solvent (Phenethylcumene) | 40.0% |
| Good Solvent | 20.0% |
| (Triethylene glycol monomethyl ether) | |
| Good Solvent (Carbitol) | 36.0% |

After sufficiently dissolving the aforesaid dye in the mixture of the solvents at room temperature, the solution was filtrated by a membrane filter having poresize of 0.45 micron.

When continuous ejection was performed by an electrostatic ink jet printer using the ink composition thus obtained, abnormal ejection occurred after 50 hours.

In Comparison Example 2, the solubilities (shown in %) of the black oil-soluble dye in the poor solvent (phenethylcumene), the good solvent (triethylene glycol monomethyl ether), the good solvent (carbitol), and the mixed solvent were 0.04, 9.4, 17.8, and 12.9, respectively. Thus, the value of a/b of the ink composition was 3.2.

COMPARISON EXAMPLE 3

| Black Oil-Soluble Dye | 3.0% |
|---|---|
| (Same as the dye in Example 3) | |
| Good Solvent (Ethyl cellosolve) | 82.0% |
| Good Solvent (Oleic acid) | 15.0% |

After sufficiently dissolving the aforesaid dye in the mixture of the solvents at room temperature, the solution was filtrated by a membrane filter having pore size of 0.45 micron to provide an ink composition.

When continuous ejection was performed by an electrostatic ink jet printer using the ink composition thus obtained, stable ejection occurred only up to 10 hours.

In Comparison Example 3, the solubilities (shown in %) of the black oil-soluble dye in the good solvent (ethyl cellosolve), the good solvent (oleic acid), and the mixed solvent were 12.0, 7.0, and 10.2, respectively. Thus, the value of a/b of the ink composition in Comparison Example 3 was 3.4.

COMPARISON EXAMPLE 4

| Cyan Oil-Soluble Dye | 4.0% |
|---|---|
| (Same as the dye in Example 4) | |
| Poor Solvent | 30.0% |
| (Dimethylnaphthalene) | |
| Good Solvent | 66.0% |
| (Diethylene glycol dimethyl ether) | |

After sufficiently dissolving the aforesaid dye in the mixture of the solvents at room temperature, the solution was filtrated by a membrane filter having pore size of 0.45 micron.

When continuous ejection was performed by an electrostatic ink jet printer using the ink composition thus obtained, abnormal ejection occurred after 50 hours.

In Comparison Example 4, the solubilities (shown in %) of the cyan oil-soluble dye in the poor solvent (dimethylnaphthalene), the good solvent (diethylene glycol dimethyl ether), and the mixed solvent were 0.06, 20.5, and 13.2, respectively. Thus, the value of a/b of the ink composition in Comparison Example 4 was 3.3.

COMPARISON EXAMPLE 5

| | |
|---|---|
| Cyan Oil-Soluble Dye (Same as the dye in Example 5) | 4.0% |
| Poor Solvent (Phenethylcumene) | 36.0% |
| Good Solvent (Ethyl alcohol) | 20.0% |
| Good Solvent (Ethylene Glycol-2-ethylhexyl ether) | 40.0% |

After sufficiently dissolving the aforesaid dye in the mixture of the solvents at room temperature, the solution was filtered by a membrane filter having poresize of 0.45 micron to provide an ink composition.

When continuous ejection was performed by an electrostatic ink printer using the ink composition thus obtained, abnormal ejection occurred after 10 hours.

In Comparison Example 5, the solubilities (shown in %) of the cyan oil-soluble dye in the poor solvent (phenethylcumene), the good solvent (ethyl alcohol), the good solvent (ethylene glycol-2-ethylhexyl ether), and the mixed solvent were 0.08, 28.5, 10.5, and 14.6, respectively. Thus, the value of a/b of the ink composition in Comparison Example 5 was 3.7.

COMPARISON EXAMPLE 6

| | |
|---|---|
| Magenta Oil-Soluble Dye (Same as the dye in Example 6) | 8.0% |
| Poor Solvent (Phenethylcumene) | 20.0% |
| Poor Solvent (Phenylxylylethane) | 17.0% |
| Good Solvent (Oleic acid) | 15.0% |
| Good Solvent (N-Methyl-2-pyrrolidone) | 41.0% |

After sufficiently dissolving the aforesaid dye in the mixture of the solvents at room temperature, the solution was filtrated by a membrane filter having poresize of 0.45 micron to provide an ink composition.

When continuous ejection was performed by an electrostatic ink jet printer using the ink composition thus obtained, abnormal ejection occurred after 20 hours.

In Comparison Example 6, the solubilities (shown in %) of the magenta oil-soluble dye in the poor solvent (phenethylcumene), the poor solvent (phenylxylylethane), the good solvent (oleic acid), the good solvent (N-Methyl-2-pyrrolidone), and the mixed solvent were 0.01, 0.02, 25.5, 28.0, and 24.5, respectively. Thus, the value of a/b of the ink composition was 3.5.

COMPARISON EXAMPLE 7

| | |
|---|---|
| Magenta Oil-Soluble Dye (Same as the dye in Example 7) | 4.0% |
| Good Solvent (Carbitol) | 81.0% |
| Good Solvent (Oleic acid) | 15.0% |

After sufficiently dissolving the aforesaid dye in the mixture of the solvents at room temperature, the solution was filtrated by a membrane filter having poresize of 0.45 micron to provide an ink composition.

When continuous ejection was performed by an electrostatic ink jet printer using the ink composition thus obtained, abnormal ejection occurred after 20 hours. The value of a/b of the ink composition was 6.4.

In Comparison Example 7, the solubilities (shown in %) of the magenta oil-soluble dye in the good solvent (carbitol), the good solvent (oleic acid), and the mixed solvent were 25.0, 17.5, and 25.6, respectively. Thus, the value of a/b was 6.4.

COMPARISON EXAMPLE 8

| | |
|---|---|
| Yellow Oil-Soluble Dye (Same as the dye in Example 8) | 3.0% |
| Poor Solvent (Isopropylnaphthalene) | 27.0% |
| Good Solvent (Diglyme) | 60.0% |
| Good Solvent (N-Butyl-p-toluenesulfonamide) | 10.0% |

After sufficiently dissolving the aforesaid dye in the mixture of the solvents, the solution was filtrated by a membrane filter having pore size of 0.45 micron to provide an ink composition.

When continuous ejection was performed by an electrostatic ink jet printer using the ink composition thus obtained, abnormal ejection occurred after 30 hours.

In Comparison Example 8, the solubilities (shown in %) of the yellow oil-soluble dye in the poor solvent (isopropylnaphthalene), the good solvent (diglyme), the good solvent (N-butyl-p-toluenesulfonamide), and the mixed solvent were 0.45, 28.0, 20.0 and 26.7, respectively. Thus, the value of a/b of the ink composition in Comparison Example 8 was 8.9.

COMPARISON EXAMPLE 9

| | |
|---|---|
| Yellow Oil-Soluble Dye (Same as the dye in Example 9) | 4.0% |
| Good Solvent (Toluene) | 81.0% |
| Good Solvent (Tricresyl phosphate) | 15.0% |

After sufficiently dissolving the aforesaid dye in the mixture of the solvents at room temperature, the solution was filtrated by a membrane filter having poresize of 0.45 micron to provide an ink composition.

When continuous ejection was confirmed by an electrostatic ink jet printer using the ink composition thus obtained, abnormal ejection occurred after 50 hours.

In Comparison Example 9, the solubilities (shown in %) of the yellow oil-soluble dye in the good solvent (toluene), the good solvent (tricresyl phosphate), and the mixed solvent were 18.0, 9.1, and 15.6, respectively. Thus, the value of a/b was 3.9.

As described above, the organic solvent-based ink composition of this invention for ink jet printer has advantages that the ink composition can give printed images having excellent image quality in the case of performing ink jet printing and can perform very stable ejection of ink for a long period of time.

While the invention has been described in detail and with reference to specific embodiments thereof, it will be apparent to one skilled in the art that various changes and modifications can be made therein without departing from the spirit and scope thereof.

What is claimed is:

1. An organic solvent-based ink composition for ink jet printer comprising a dye or dyes dissolved in a mixed solvent of a good solvent and a poor solvent, wherein
   (1) a solvent having a dye solubility of at least 4% by weight is used as the good solvent, (2) a solvent having a dye solubility of less than 0.5% by weight is used as the poor solvent, and (3) when the dye solubility for the aforesaid mixed solvent is a % by weight and the concentration of the dye or dyes in the ink composition to the mixed solvent is b % by weight, the value of a/b is within the range of from 1.0 to 3.0.

2. The organic solvent-based ink composition according to claim 1, wherein a content of the poor solvent in the ink composition is at least 50% by weight.

3. The organic solvent-based ink composition according to claim 1, wherein a concentration of the dye is within a range of 0.5 to 10.0% by weight.

4. The organic solvent-based ink composition according to claim 1, wherein the ink jet recording is of an electrostatic ink jet using electrostatic force system.

5. In the process of producing an ink composition suited for use in ink jet printing by dissolving at least one ink in a vehicle comprising a mixed solvent system, the improvement which comprises utilizing a solvent system comprising a mixture of a first, good, solvent having a dye solubility of at least about 4% by weight, and a second, poor, solvent having a dye solubility of less than 05% by weight, and wherein the ratio of the solubility of the dye in the mixed solvent to the concentration of dye in the mixed solvent is between 1 and 3.

6. In the process of printing by means of an ink jet printing means, using as the ink a solution of at least one dye dissolved in a mixed solvent system, the improvement which comprises using as said solvent system a mixture of a first, good, solvent having a solubility for said dye of at least about 4% by weight, and a second, poor solvent having a solubility for said dye of less that about 0.5% by weight, and wherein the ratio of the solubility said dye in said mixed solvent to the concentration of said dye in the mixed solvent is between 1 and 3.

* * * * *